(12) United States Patent
Lum et al.

(10) Patent No.: US 9,170,584 B2
(45) Date of Patent: *Oct. 27, 2015

(54) WATER CIRCULATION SYSTEM VALVE ASSEMBLIES HAVING WATER TEMPERATURE CONTROL

(71) Applicant: Grundfos Pumps Corporation, Olathe, KS (US)

(72) Inventors: Ken Lum, Fresno, CA (US); Dale Kempf, Manton, CA (US)

(73) Assignee: Grundfos Pumps Corporation, Olathe, KS (US)

( * ) Notice: Subject to any disclaimer, the term of this patent is extended or adjusted under 35 U.S.C. 154(b) by 57 days.

This patent is subject to a terminal disclaimer.

(21) Appl. No.: 13/875,454

(22) Filed: May 2, 2013

(65) Prior Publication Data
US 2013/0240053 A1    Sep. 19, 2013

Related U.S. Application Data

(60) Continuation of application No. 13/175,435, filed on Jul. 1, 2011, now Pat. No. 8,434,510, which is a division of application No. 11/825,059, filed on Jul. 2, 2007, now Pat. No. 7,971,601.

(51) Int. Cl.
*F16K 31/68* (2006.01)
*G05D 23/02* (2006.01)
*F16K 31/00* (2006.01)
*G05D 23/13* (2006.01)

(52) U.S. Cl.
CPC .............. *G05D 23/02* (2013.01); *F16K 31/002* (2013.01); *G05D 23/134* (2013.01); *Y10T 137/2574* (2015.04); *Y10T 137/6497* (2015.04); *Y10T 137/7737* (2015.04); *Y10T 137/7758* (2015.04)

(58) Field of Classification Search
CPC .................. Y10T 137/2574; Y10T 137/6497; F16K 31/002; G05D 23/134
See application file for complete search history.

(56) References Cited

U.S. PATENT DOCUMENTS 2,842,155 A * 7/1958 Peters ........................... 137/337
7,392,955 B1 * 7/2008 Laing ........................ 236/12.13

* cited by examiner

*Primary Examiner* — John Fox
(74) *Attorney, Agent, or Firm* — Jay J. Hoette; The Small Patent Law Group LLC

(57) ABSTRACT

A valve assembly for a water circulation system includes a valve body defining a bypass passage between a hot water side and a cold water side of the valve body. The bypass passage has a valve seat therein. A bypass valve is received within the bypass passage. The bypass valve restricts the flow of water through the bypass passage based on a temperature of the water in the bypass passage. The bypass valve is variably positionable with respect to the valve seat to control a bypass shut-off temperature of the water.

20 Claims, 12 Drawing Sheets

WATER CIRCULATION SYSTEM VALVE ASSEMBLIES HAVING WATER TEMPERATURE CONTROL

CROSS REFERENCE TO RELATED APPLICATION

The present application is a continuation application of and claims priority from U.S. application Ser. No. 13/175,435 filed Jun. 1, 2011, titled "WATER CIRCULATION SYSTEM VALVE ASSEMBLIES HAVING WATER TEMPERATURE CONTROL", which is a divisional application of and claims priority from U.S. application Ser. No. 11/825,059, now U.S. Pat. No. 7,971,601 which issued Jul. 5, 2011, the complete subject matter of which is hereby expressly incorporated by reference in its entirety.

BACKGROUND OF THE INVENTION

The subject matter herein relates generally to water circulating systems, and more particularly, to valve assemblies for water circulating systems.

Home and industrial water distribution systems distribute water to various fixtures, including sinks, bathtubs, showers, dishwashers and washing machines, that are located throughout the house or industrial building. The typical water distribution system brings water in from an external source, such as a city main water line or a private water well, to the internal water distribution piping system. The water from the external source is typically either at a cold or cool temperature. One segment of the piping system takes this incoming cold water and distributes it to the various cold water connections located at the fixtures where it will be used (e.g., the cold water side of the faucet at the kitchen sink). Another segment of the piping system delivers the incoming cold water to a water heater which heats the water to the desired temperature and distributes it to the various hot water connections where it will be used (e.g., the hot water side of the kitchen faucet). At the fixture, cold and hot water either flows through separate hot and cold water control valves that are independently operated to control the temperature of the water into the fixture by controlling the flow rate of water from the separate valves, or the water is mixed at a single valve that selectively controls the desired water temperature flowing from the fixture.

A problem with most home and industrial water distribution systems is that hot water is not always readily available at the hot water side of the fixture when it is desired. This problem is particularly acute in water use fixtures that are located a distance from the hot water heater or in systems with poorly insulated pipes. When the hot water side of these fixtures is left closed for some time, such as overnight, the hot water in the hot water segment of the piping system sits in the pipes and cools. As a result, the temperature of the water between the hot water heater and the fixture lowers until it becomes cold or at least tepid. When opened again, it is not at all uncommon for the hot water side of such a fixture to supply cold water through the hot water valve when it is first opened and for some time thereafter. At the sink, bathtub or shower fixture located away from the water heater, the person desiring to use the fixture will either have to use cold or tepid water instead of hot water or wait for the distribution system to supply hot water through the open hot water valve. Most users have learned that to obtain the desired hot water, the hot water valve must be opened and left open for some time so that the cool water in the hot water side of the piping system will flow out ahead of the hot water. For certain fixtures, such as virtually all dishwashers and washing machines (which are not usually provided with a bypass valve), there typically is no method of "draining" away the cold or tepid water in the hot water pipes prior to utilizing the water in the fixture.

The inability to have hot water at the hot water side of the fixture when it is desired creates a number of problems. One problem is having to utilize cold or tepid water when hot water is desired. This is a particular problem for the dishwasher and washing machine fixtures in that hot water is often desired for improved operation of those appliances. Certain dirty dishes and clothes are much easier to clean in hot water as opposed to cold or tepid water. Even in those fixtures where the person can let the cold or tepid water flow out of the fixture until it reaches the desired warm or hot temperature, there are certain problems associated with such a solution. One such problem is the waste of water that flows out of the fixture through the drain and, typically, to the sewage system. This good and clean water is wasted (resulting in unnecessary water treatment after flowing through the sewage system). Water waste is compounded when the person is inattentive and hot water begins flowing down the drain and to the sewage system. Yet another problem associated with the inability to have hot water at the hot water valve when needed is the waste of time for the person who must wait for the water to reach the desired temperature.

The use of bypass valves and/or water recirculation systems in home or industrial water distribution systems to overcome the problems described above have been known for some time. However, these water recirculation systems have problems and limitations. For example, these water recirculation systems are typically operated by a pump and the pump must be operated for a certain cycle time to dispel all of the cooled water from the hot water pipe system before hot water is available at the fixture. Problems arise when hot water is desired at the fixture before the end of a cycle, or when the pump is not running. However, constantly running the pump so that hot water is always available is not economical. Accordingly, the above mentioned problems (e.g. waste of water) are still prevalent in water recirculation systems today.

An additional problem with known bypass valves is that over time and with age the valves, particularly valves that are directly operated by a thermal actuator (such as a wax filled cartridge) tend not to have any toggle action. Instead, after a number of on-off cycles, the valves tend to just throttle the flow until the water reaches an equilibrium temperature, at which time the valve stays slightly cracked open. While this meets the function of keeping the water at a remote fixture hot, leaving the valve in a slightly open condition does present two problems. First, the lack of toggle action can result in scale build-up on the actuator body and/or rod because the rod is constantly extended. At least some known bypass valves utilize screens to filter debris or minerals from the bypass passage. However, these screens tend to clog themselves, limiting the flow to the bypass passage. Second, the open valve constantly bleeds a small amount of hot or almost hot water into the cold water piping, thereby keeping the faucet end of the cold water pipe substantially warm. If truly cold water is desired (i.e., for brushing teeth, drinking, or making cold beverages), then some water must be wasted from the cold water faucet to drain out the warm water. It is also detrimental to have any noticeable crossover flow (siphoning) from hot to cold or cold to hot with any combination of faucet positions, water temperatures, or pump operation.

BRIEF DESCRIPTION OF THE INVENTION

In one embodiment, a valve assembly is provided for a water circulation system, wherein the valve assembly includes a valve body defining a bypass passage between a hot water side and a cold water side of the valve body. The bypass passage has a valve seat therein. A bypass valve is received within the bypass passage. The bypass valve restricts the flow of water through the bypass passage based on a temperature of the water in the bypass passage. The bypass valve is variably positionable with respect to the valve seat to control a bypass shut-off temperature of the water.

In another embodiment, a valve assembly for a water circulation system is provided that includes a valve body having a hot water inlet and a hot water outlet, wherein the valve body has an inner wall extending between the hot water inlet and the hot water outlet. A bypass portion is provided that has a bypass passage receiving water flow through an opening in the inner wall. The bypass portion has a thermally sensitive actuating element being received within the bypass passage and movable between an open position and a closed position based on a temperature of the water in the bypass passage. The valve assembly includes a plug received within the opening, wherein the plug is positioned within the opening such that a circumferential passage surrounds the plug. The circumferential passage is in flow communication with the bypass passage.

In a further embodiment, a valve assembly for a water circulation system is provided that includes a valve body having a hot water inlet and a hot water outlet. A bypass portion is provided that has a bypass passage in fluid communication with the hot water inlet and the hot water outlet. The bypass portion has an inner wall with an opening therein, and the bypass portion has a thermally sensitive actuating element being received within the bypass passage and movable between an open position and a closed position based on a temperature of the water in the bypass passage. The valve assembly includes a screen element having a screen body defining an inner bore, wherein the inner bore extends between an inlet end and an outlet end, wherein water flows through the inner bore from the inlet end to the outlet end.

In yet another embodiment, a valve assembly is provided including a body having a plurality of ports defining a hot water inlet port, a cold water inlet port, at least one outlet port, and a hot water return port. Water is dispensed from the body via the at least one outlet port. A bypass control unit is configured to permit recirculating flow from the hot water inlet port to at least one of the cold water port and the hot water return port. A plug is removably coupled to the body, wherein when the plug is coupled to the body, the bypass control unit permits recirculating flow to the cold water port, and wherein when the plug is removed from the body, the bypass control unit permits recirculating flow to the hot water return port.

DETAILED DESCRIPTION OF THE INVENTION

Figure 1:
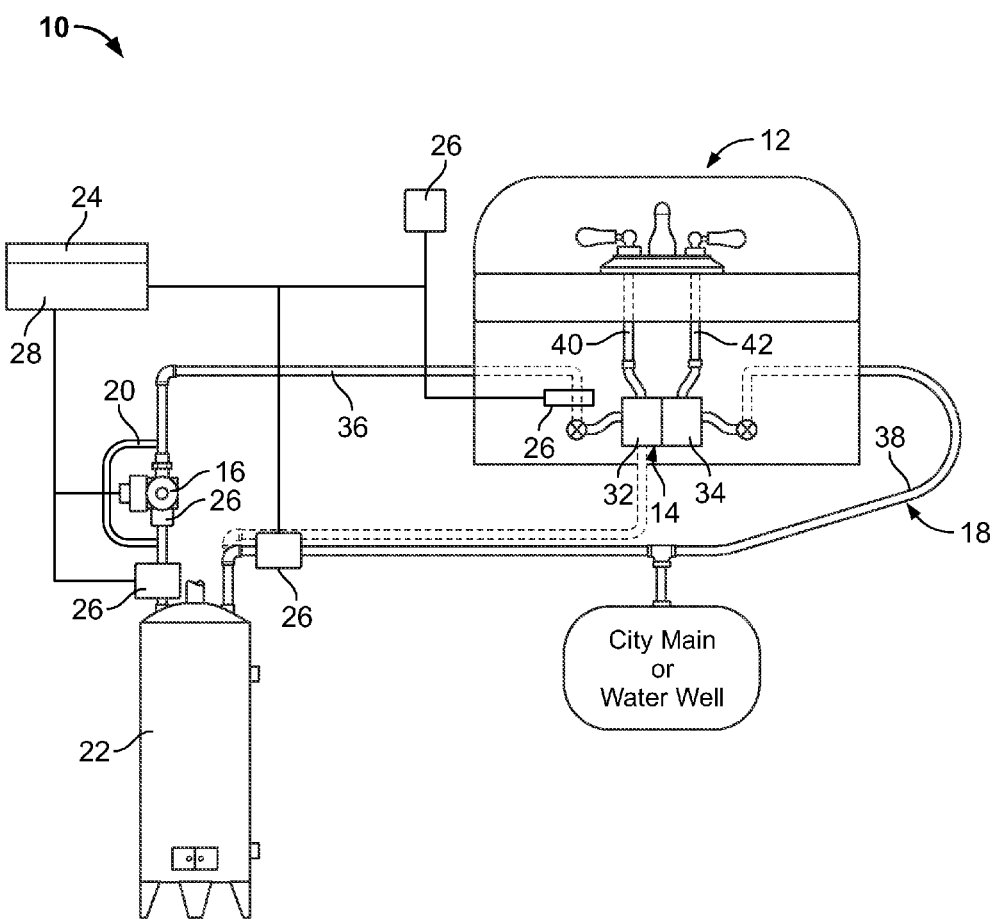
FIG. 1 is a side elevation view showing a water circulation system and fixture utilizing a valve assembly in accordance with an exemplary embodiment.

FIG. 1 is a side elevation view showing a water circulation system 10 and fixture 12 utilizing a valve assembly 14 in accordance with an exemplary embodiment. In order to achieve the desired circulation flow, a single circulating pump 16 is utilized as part of a piping system 18 of the water circulating system 10. The pump 16 may be a single, small pump of the type used in residential hot water space heating. To avoid reduced flow, a check valve 20 can be plumbed in parallel with the pump 16 or incorporated within the pump housing, to pass a flow rate exceeding the pump's capacity around the pump 16. When the pump 16 is powered and flow demand is low, the check valve 20 prevents the boosted flow from re-circulating back to its own inlet.

In the illustrated embodiment, the pump 16 is located at or near a water heater 22 in the discharge piping or hot water piping. While a conventional home water heater is illustrated in FIG. 1, it is realized that other types of water heaters may be used, such as a tankless water heater. When operated, the pump 16 boosts the pressure in the hot water piping somewhat above that in the cold water pipes (e.g., perhaps one to three feet of boost) causing a pressure differential in the hot water piping. With this arrangement only one pump 16 per plumbing system (e.g., per water heater) is required with any reasonable number of remote faucet sets (e.g., the typical number used in residences) equipped with bypass valves 10. In alternative embodiments, the pump 16 may be located in other pump locations, such as in the hot water piping near the fixture 12, at the fixture 12, in the supply piping near the water heater 22, or the like.

In one embodiment, the pump 16 may operate twenty-four hours a day, with most of the time in the no flow mode. However, this is unnecessary and wasteful of electricity. Alternatively, the pump 16 can have a timer 24 to turn on the pump 16 daily at one or more times during the day just before those occasions when hot water is usually needed the most (e.g., for morning showers, evening cooking, etc.) and be set to operate continuously for the period during which hot water is usually desired. This still could be unnecessary and wasteful of electricity. Another alternative is to have the timer 24 cycle the pump 16 on and off regularly during the period when hot water is in most demand. The "on" cycles should be of sufficient duration to bring hot water to all remote fixtures 12, and the "off" period would be set to approximate the usual time it takes the water in the lines to cool-down to minimum acceptable temperature. By using a time-of-day control timer 24, the pump 16 operates to maintain "instant hot water" only during periods of the day when hot water is commonly desired. During the off-cycle times, the plumbing system operates just as if the pump 16 were not in place. This saves electrical power usage from pump operation and, more importantly, avoids the periodic introduction of hot water into relatively uninsulated pipes during the off-hours, thereby saving the cost of repeatedly reheating this water. The time-of-day control also avoids considerable wear and tear on the pump 16. Considerable additional benefits are gained by using a cyclic timer 24, with or without the time-of-day control.

Optionally, a sensor 26 may be provided within the water circulation system 10 to detect flow characteristics of water within the water circulation system 10, such as in the supply pipes. The sensor 26 may be used with or without the timer 24 to control the operation of the pump 16. The sensor 26 may be located at the pump 16 or the sensor 26 may be located elsewhere in the system, such as at the fixture, at the cold water pipe, at the hot water pipe, at the water heater 22, and the like. The sensor 26 may be sized to detect significant flows only (e.g., those flows that are much larger than flows through the valve assembly 14), such as a shower flowing. Optionally, the sensor 26 may constitute a flow sensor that operates to detect a flow characteristic of actual flow of water through the pipes or through the pump 16. The sensor 26 may also be coupled with an electrical switch, such as a reed switch, for controlling a component within the water circulation system 10, such as the pump 16, a valve, and the like. Optionally, the sensor 26 may be, or may include, a transducer.

In an alternative embodiment, the sensor 26 may constitute a pressure sensor that operates to detect a flow characteristic of either a pressure value at a particular point within the water circulation system 10, or a change in pressure within the water circulation system 10 to detect flow. Alternatively, the sensor 26 may constitute a temperature sensor that operates to detect a flow characteristic of temperature, such as a temperature value or a change in temperature to detect flow of water through the water circulation system 10. Alternatively, the sensor 26 may constitute a manually activated switch, a push button switch, a motion detector, a photo-detector, a noise detector, an infrared sensor, a door sensor, a floor pressure sensor, or an appliance activation sensor for activating the pump 16.

The sensor 26 may be located proximate (e.g. at or near) the supply pipes, proximate the return pipes, proximate the pump 16, proximate the water heater 22, proximate the valve assembly 14, proximate the fixture 12, within the same room as the fixture 12, within the piping system, or elsewhere within the building housing the water circulation system 10. In the illustrated embodiment, the system 10 includes a first sensor 26 (e.g. a flow sensor) near the water heater 22, attached to the hot water supply pipe, a second sensor 26 (e.g. a manually activated sensor) within the room having the fixture 12, and a third sensor 26 (e.g. a temperature sensor) in the return pipe near the water heater 22. The return pipe may be a dedicated return pipe from the fixture or may be the cold water supply pipe, through which recirculation flow is permitted. The location of the switches 26 depends upon factors such as the type of sensor 26, the type of system 10, the preference of the user, new or existing construction of the building, and the like.

The sensor 26 may communicate with a controller 28, which in turn communicates with the pump 16. The communication may be wired or wireless. The controller 28 may be separately provided from the pump 16 and the sensor 26, or alternatively, may be integral with the pump 16 and/or the sensor 26. In another alternative embodiment, the sensor 26 may communicate directly with the pump 16. The timer 24 may also communicate with the controller 28, and may be integral with the controller 28. In one embodiment, when the cyclic timer 24 is used, the sensor 26 may be wired in series with the pump motor, and the sensor 26 may prevent the motor from cycling if an existing flow is detected at the moment the timer calls for pump on. The use of such a sensor 26 accomplishes several useful objectives, including reducing electrical power usage and extending pump life if hot water is already flowing and there is no need for the pump to operate, avoiding a sudden temperature rise and the likelihood of scalding that could result from the pump boost if water is being drawn from a "mixing" valve (such as a shower or single handle faucet) and allowing use of a "large" pump (now that the danger of scalding is eliminated) with its desirable low pressure drop at high faucet flows, thereby eliminating the need for the parallel check valve 20 required with a "small" pump.

In alternative embodiments, the water circulation system 10 may also include at least one temperature sensor coupled to the pipes of the water circulation system 10 for providing temperature feedback to the pump 16. For example, the sensor 26 may be placed proximate and/or downstream of the most remote fixture within the water circulation system 10. The sensor 26 may be placed near the water heater 22 in a dedicated return pipe or the cold water return pipe. The operation of the pump 16 may be controlled by the temperature sensor, such as by turning the pump 16 on when the temperature of the water reaches a predetermined threshold, or alternatively, falls by a predetermined amount or at a predetermined rate. Similarly, the pump 16 may be turned off when the temperature of the water reaches a predetermined threshold, or alternatively, rises by a predetermined amount or at a predetermined rate. In another alternative embodiment, the pump 16 may be controlled based on the flow of water within the water circulation system 10. For example, by using the sensor 26 as a flow detector (e.g. a flow sensor, a pressure sensor, a temperature sensor, and the like), the operation of the pump 16 may be controlled based on flow characteristics of the water in the water circulation system 10. For example, when a user demands hot water, such as by turning on the faucet, the flow of water through the pipes and/or the pump may be detected and the pump 16 may be turned on. Other demand-type sensors may be provided to turn the pump on, such as pressing a manual switch, or by activating another type of sensor such as an IR sensor.

The valve assembly 14 includes a valve body 32 which is illustrated schematically in FIG. 1. The valve body 32 includes a bypass portion 34, which includes a bypass control unit for controlling the flow of water through the bypass portion 34. In an exemplary embodiment, the valve assembly 14 is connected between a hot water supply line 36 and a cold water supply line 38. The valve assembly 14 connects to the supply lines 36 and 38 and the bypass portion 34 creates a flow path therebetween. Cooled water from the hot supply line 36 is directed through the bypass portion 34 into the cold supply line 38 and ultimately back to the water heater 22. The valve assembly 14 is also connected to fixture supply lines 40 and 42 that supply hot and cold water, respectively, to the fixture 12. In one embodiment, the valve body 32 is connected to the hot supply lines 36, 40 and the cold supply lines 38, 42. In one embodiment, the valve body 32 may be formed from a single integral body. Alternatively, the valve body 32 may be formed from two or more portions that are separately fabricated and coupled to one another. In another alternative embodiment, an interconnection, such as a coupler or even a flexible pipe, may be provided between the portions. In yet another alternative embodiment, the valve body 32 may be integrated with the fixture 12, and may be received within the housing of the fixture 12, attached to the fixture 12, or mounted proximate the fixture 12.

In alternative embodiments, other connection configurations may be provided. For example, a single fixture supply line may be provided, wherein mixing of the hot and cold water occurs within the valve body 32. Additionally, the valve assembly 14 may be connected to a dedicated return line (shown in phantom in FIG. 1) that is connected to the water heater 22, wherein hot water recirculation is permitted through the dedicated return line as opposed to the cold supply line 38. In such an embodiment, the hot and cold supply lines 36, 38 may or may not be in fluid communication with one another, depending on the particular application. In one embodiment utilizing the dedicated return line, the valve assembly 14 may not be connected to either the cold water supply line 38 or the cold water fixture supply line 42. Rather, the valve assembly 14 is connected to the hot water supply line 36, the hot water fixture supply line 40, and the dedicated return line.

Figure 2:
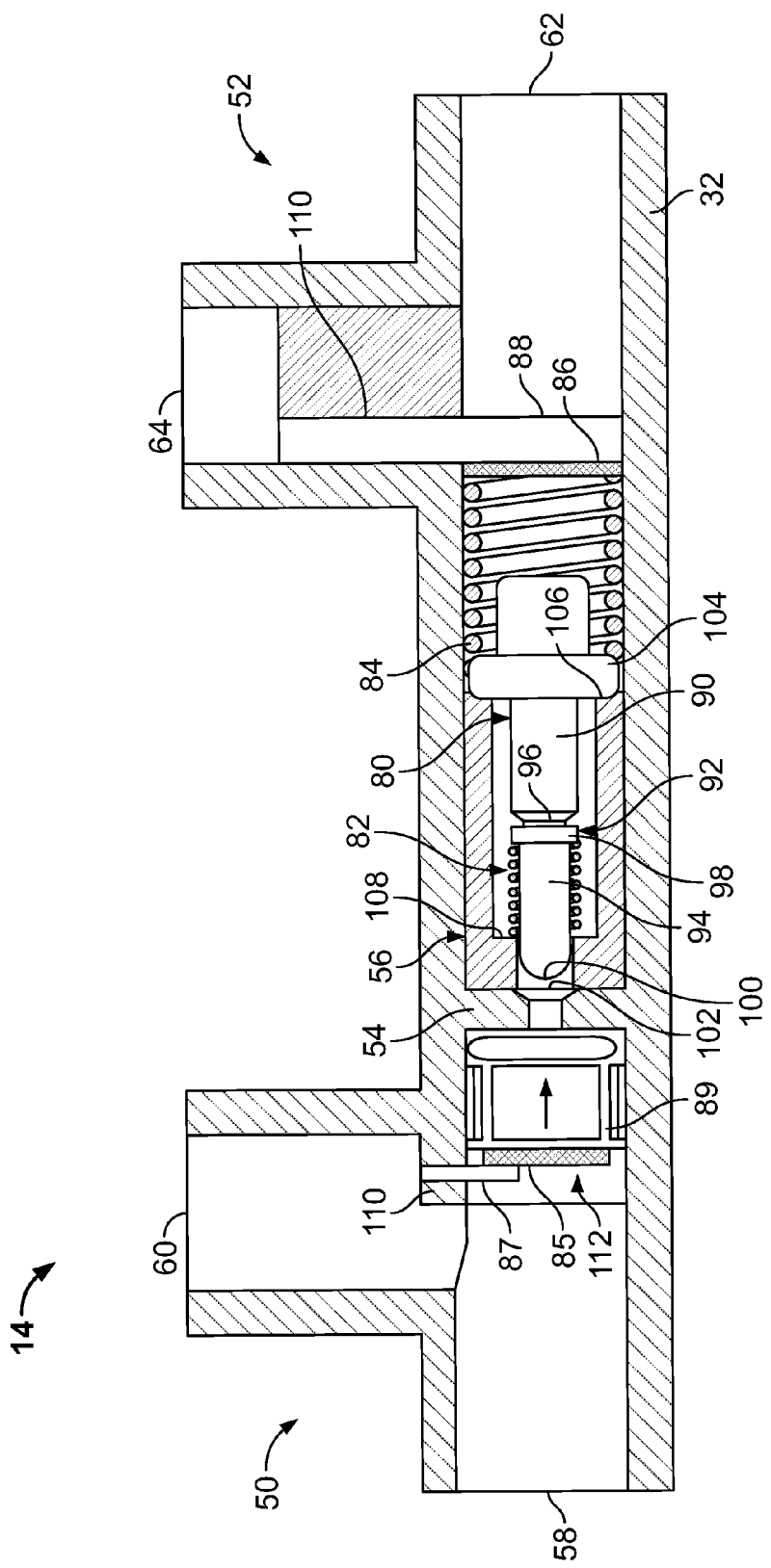
FIG. 2 is a side elevation view of an exemplary valve assembly for use with the water circulation system and fixture with a portion of a body of the valve assembly cutaway to illustrate the various components of the valve assembly.

FIG. 2 is a side elevation view of an exemplary valve assembly 14 with a portion of the valve body 32 cutaway to illustrate the various components of the valve assembly 14. The body 32 is generally tubular, and in the illustrated embodiment, is a single, unitary member having a first end 50, a second end 52 and a separating wall 54 disposed between the first end 50 and the second end 52. A passage 56 extends from the separating wall 54 to the second end 52. The passage 56 interconnects the first end 50 and the second end 52 and allows fluid to flow therethrough. In one embodiment, the valve body 32 is manufactured out of a molded plastic material having relatively high strength and chemical/corrosion resistant characteristics. The molded plastic material provides the ability to manufacture the valve body 32 utilizing injection molding processes with the design based on the configuration described herein without the need for expensive casting or machining. Alternatively, the valve body 32 can be manufactured from various plastics, reinforced plastics or metals that are suitable for "soft" plumbing loads and resistant to hot chlorinated water under pressure.

The valve body 32 has four threaded ports, an axial and radial port at the first end 50 and an axial and radial port at the second end 52. The first end 50 is designated to receive and discharge hot water and the second end 52 is designated to receive and discharge cold water from a source of cold water, such as a city water supply system or a local water well. While other configurations are possible in alternative embodiments, in the illustrated embodiment, the axial ports are designated as inlet ports and the radial ports are designated as discharge ports. For example, at the first end 50 (the hot water side) is a first inlet port 58 and a first discharge port 60 and at the second end 52 (the cold water side) is a second inlet port 62 and second discharge port 64. Conversely, the radial ports can be the inlet ports and the axial ports can be the discharge ports, or a combination thereof. Additionally, more or less ports may be provided, such as a single discharge port. As discussed in detail below, the first and second inlet ports 58, 62 connect to the hot and cold water distribution system and the first and second discharge ports 60, 64 connect to the hot and cold water valves on the fixture (i.e., sink, shower, bathtub or etc.) with which the valve assembly 14 is utilized.

In an exemplary embodiment, the bypass portion 34 of the valve body 32 includes a flow control unit for controlling the flow of water through the bypass portion 34. In the illustrated embodiment, the flow control unit is represented by a thermally sensitive actuating element 80. However, in alternative embodiments, other types of devices may be used to control flow through the bypass portion. For example, the device may be electrically actuated, hydraulically actuated, pneumatically actuated, and the like. The flow control unit may be thermally actuated, such as the actuating element 80 or other types of thermally actuated devices, or the flow control unit may be actuated in response to other types of stimuli, such as pressure, flow, manual activation, and the like.

In the illustrated embodiment, the valve body 32 houses the thermally sensitive actuating element 80 in addition to a bias spring 82, an over-travel spring 84, first and second screens 85 and 86, first and second retaining pins 87 and 88, and may house a check valve 89. The thermally sensitive actuating element 80 may be of the wax filled cartridge type, also referred to as wax motors, having an actuator body 90 and an integral piston/poppet rod member 92. The rod member 92 includes a poppet 94 attached to a piston 96 with an intermediate flange 98 thereon. The piston 96 of the rod member 92 interconnects the poppet 94 with the actuator body 90. An end 100 of the poppet 94 seats against a valve seat 102 at the separating wall 54 to close the passage 56. The actuator body 90 has a section 104 of increased diameter to seat against a shoulder 106 in the valve body 32. The over-travel spring 84 abuts against one side of the section 104 and the opposed side of the section 104 abuts against the shoulder 106.

An internal shoulder 108 is provided inside valve body 12 at an end of the passage 56 for fixedly receiving and positioning one end of the bias spring 82. The other end of the bias spring 82 engages the rod member 92, and generally forces the rod member 92 toward the actuator body 90. Optionally, the valve assembly 14 may be operated without the bias spring 82. For example, the actuating element 80 may be formed using a shape memory alloy that has linear memory characteristics, such as, but not limited to, a nickel-titanium alloy, a copper-zinc-aluminum alloy, a copper-aluminum-nickel alloy, and the like.

Retaining pin holes 110 are provided in the valve body 32 for receiving the retaining pins 87 and 88. The first end 50 is molded with a retaining slot 112 for receiving with the check valve 89 and the retaining pin 88 is used to hold the check valve 36 in place. The first screen 85 is also positioned in the passage 56 and retained by the first retaining pin 87. The screen 85 can be a small wire fabric, mesh-type screen that is shaped and configured to fit within the first end 50 of the valve body 32. The screen 85 is utilized to keep hard water lime particles and other detritus out of the bypass valve 14. As such, the debris and/or minerals do not interfere with the operation of the actuating element 80, such as by blocking closing of the passage 56 by the poppet 94.

As described above, the section 104 of the actuator body 90 having an increased diameter seats against the shoulder 106. The over-travel spring 84 is disposed between the section 104 and the second retaining pin 88 located inside valve body 12 proximate the second end 52. The over-travel spring 84 prevents damage to a fully restrained actuating element 80 heated above a maximum operating temperature and to hold the actuating element 80 in place during operation without concern for normal tolerance. The over-travel spring 84 allows movement of the actuator body 90 away from the shoulder 106 in the event that temperature rises substantially. Without this relief, the expanding wax would distort the casing, destroying the calibrated set point. The over-travel spring 84 also holds the bias spring 82, rod member 92 and actuator body 90 in place without the need to adjust for the stack-up of axial tolerances. Alternatively, the actuating element 80 can be fixedly placed inside the valve body 32 by various mechanisms known in the art, including adhesives and the like. The over-travel spring 84 can be held in place by various internal configurations commonly known in the art, such as a molded seat. In an exemplary embodiment, however, the over-travel spring 84 abuts against the second screen 86, which is held in place by the second retaining pin 88. The screen 86 can be a small wire fabric, mesh-type screen that is shaped and configured to fit within the second end 52 of the valve body 32. The screen 86 is utilized to keep hard water lime particles and other detritus out of the bypass valve 14 and to act as a seat for the over-travel spring 84.

In operation, the actuating element 80 is movable between an open position and a closed position. In the open position, water is allowed to flow through the passage 56 from the first end 50 to the second end 52. As such, water flows from the hot side to the cold side of the valve assembly 14. In this way, the cooled water may be dispelled from the hot water lines, thus bringing hot water to the hot side of the valve assembly 14 for dispensing at the fixture. In the closed position, the poppet 94 seats against the valve seat 102 and water is restricted from flowing through the passage 56.

In the exemplary embodiment, the actuating element 80 is movable between the open and closed positions based on a temperature of the water. For example, the actuator body 90 includes a wax or a mixture of wax and metal powder (i.e., copper powder) enclosed in the actuator body 90 by means of a membrane made of elastomer or the like. Upon heating, the wax or wax with copper powder mixture slowly expands, thereby pushing the piston 96 and poppet 94 in an outward direction. Upon cooling, the wax or wax/copper powder mixture contracts and the rod member 92 is pushed inward by the bias spring 82 until the flange 98 contacts the actuator body 90 at an actuator seat. The wax filled cartridge type of thermal actuator allows the wax to be formulated to change from the solid to the liquid state at a particular desired temperature. The rate of expansion with respect to temperature at this change of state results in almost snap action of the actuating element 80. The temperature set point is equal to a preset value, such as 97 degrees Fahrenheit, desired for the hot water. A "sudden" large physical motion is provided over a small temperature change, such as, for example, 5 degrees. Additionally, the higher the temperature of the water flowing past the actuating element 80, the more the actuating element 80 expands. As stated above, this movement is reacted by the bias spring 82, which returns the rod member 92 as the temperature falls. In alternative embodiments, a wax blend may be used having a gradual expansion rather than a sudden or snap action. For example, a mix of waxes, each having different temperatures at which the wax turns from a solid to a liquid, may be combined to provide a steady closing action rather than the snap action. These waxes may be combined into the same blend or may be individually provided, and separated from one another, within the actuator body 90. In other alternative embodiments, other types of thermal actuators, such as bimetallic springs and memory alloys (i.e., Nitinol and the like) may be utilized. The valve body 32 is designed so the components of the bypass valve 14 can fit through either of the inlet and/or discharge ports, such as with a snap-in fit. In this manner, no intermediate or additional joints are required for installation.

FIGS. 3-10 illustrate various alternative embodiments of bypass valves 14. As such, like reference numerals are used in FIGS. 3-10 to refer to like components and elements.

Figure 3:
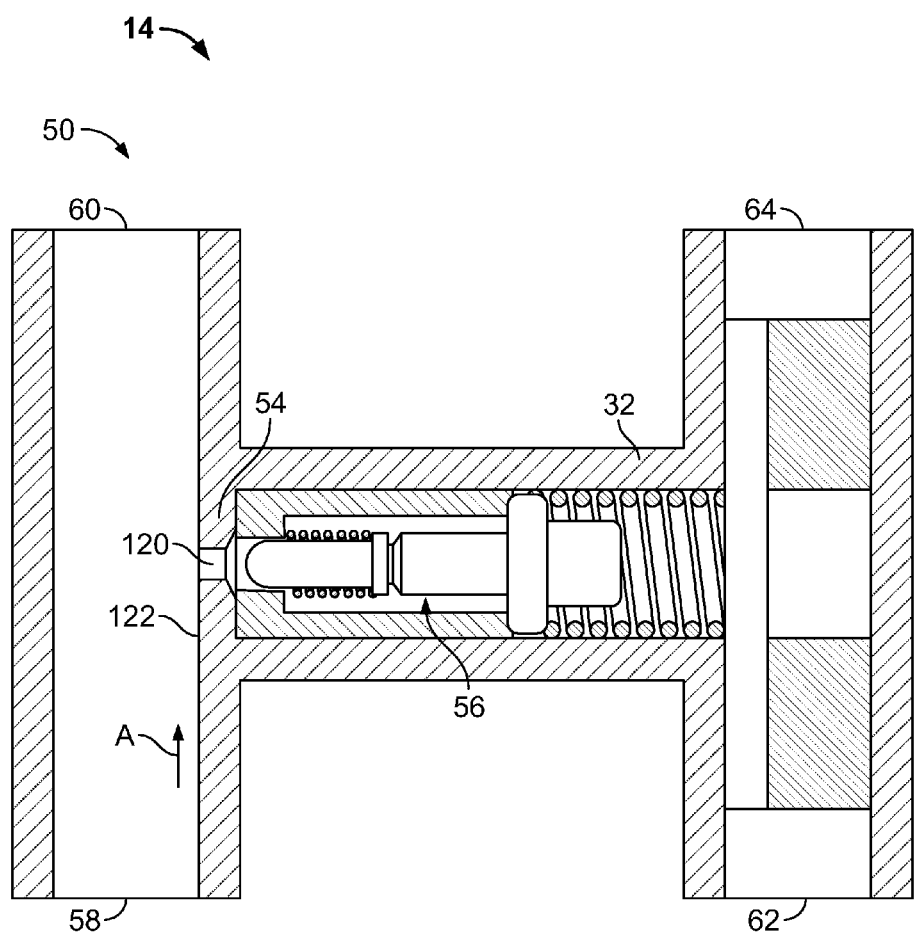
FIGS. 3-12 illustrate alternative embodiments of the valve assembly.
Figure 11:
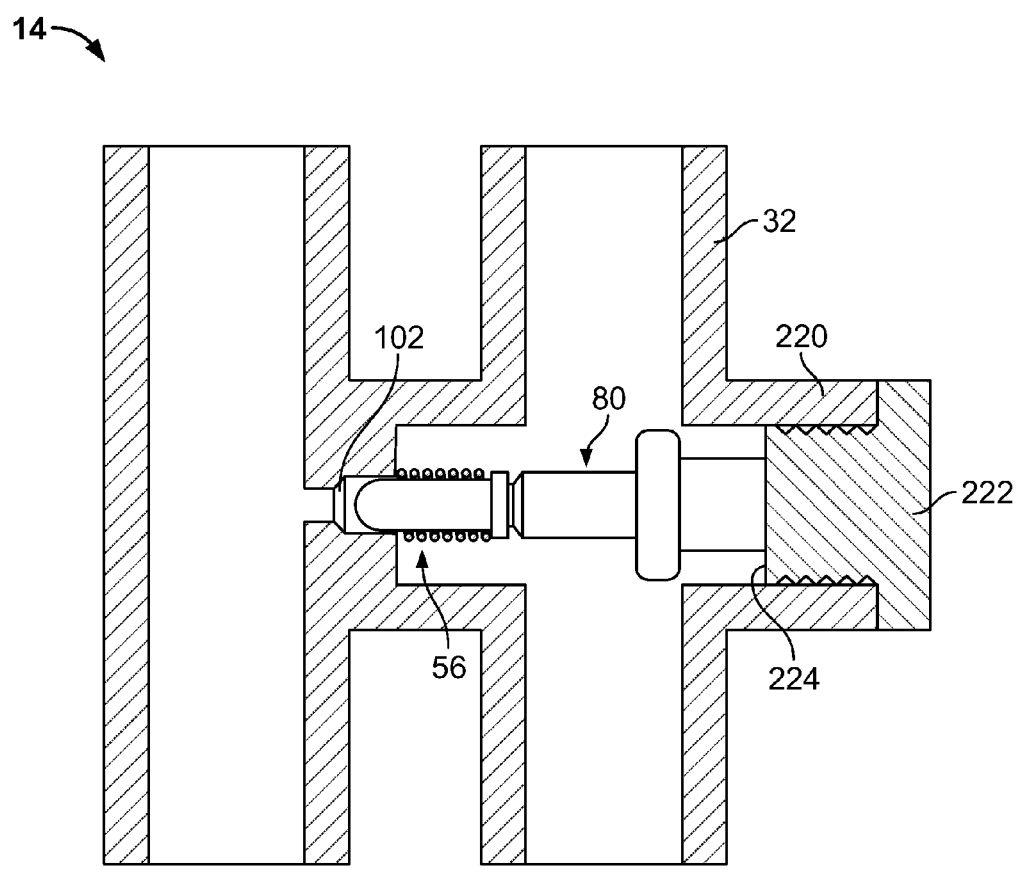

FIG. 3 is a side elevation view of the valve assembly 14, formed in accordance with an alternative embodiment, with a portion of the valve body 32 cutaway to illustrate the various components of the valve assembly 14. The valve body 32 has a different configuration than the valve body illustrated in FIG. 2, wherein the first inlet and discharge ports 58, 60 are axially aligned with one another and the second inlet and discharge ports 62, 64 are also axially aligned with one another. As such, the water flows straight through the body 32 from the respective inlet ports 58, 62 to the respective outlet ports 60, 64. Such a configuration is in contrast to the embodiment illustrated in FIG. 2, wherein the inlet and discharge ports are oriented orthogonally with respect to one another. The configuration of the valve body 32 in FIG. 3 is generally I-shaped, wherein the stem of the I-shaped body includes the passage 56. The separating wall 54 is provided at the hot end 50 of the valve body 32. In an alternative embodiment, the hot side has the radial-in/radial-out configuration illustrated in FIG. 3, but the cold side has an axial-in/radial-out configuration, such as is illustrated in FIG. 2. As such, flow through the hot side is in a single direction and flow through the cold side is in two directions. Additionally, the actuating element 80 may be loaded into the bypass passage 56 through the axial-in port of the cold side to facilitate assembly. In another alternative embodiment, both of the hot and cold sides may include radial-in/radial-out ports, as is illustrated in FIG. 3, but one of the hot and cold sides may also include an access port through the wall of the valve body. The access port is substantially aligned with the bypass passage 56 and is provided for accessing the bypass passage 56 for loading the actuating element 80 into the bypass passage 56 during assembly. An example of such an access port is illustrated in FIG. 11.

A difference between the embodiment of FIG. 3 and the embodiment of FIG. 2 is that the embodiment of FIG. 3 does not include a screen 85, a retaining pin 87 or a check valve 89 on the hot side 50 of the valve body 32. As such, the construction and assembly is simpler than the embodiment of FIG. 2. Without a screen 85, the valve assembly 14 limits debris build-up around the actuating element 80 by limiting the ability for debris to enter the passage 56. For example, an opening 120 to the passage 56 may be sized to restrict debris of a predetermined size from entering the passage 56. Additionally, any debris that clogs or seats against the opening 120 is dislodged and/or flushed away from the opening 120 by the flow of water through the first end 50. Particularly, the water flows tangent to the opening 120 along an inner wall 122, which includes the opening 120, extending between the inlet port 58 and the discharge port 60. The flow of water along the wall 122, past the opening 120, which is generally illustrated by the arrow A, forces any debris accumulated within the opening 120 out of, and away from, the opening 120. Thus, the opening remains free of debris by the flow of water through the valve body 32. Optionally, the inner wall 122 may be substantially cylindrical between the ports. Alternatively, the inner wall 122 may be bowed inward proximate the opening 120 to increase the flow across the opening 120, such as in a venturi shape.

Figure 4:
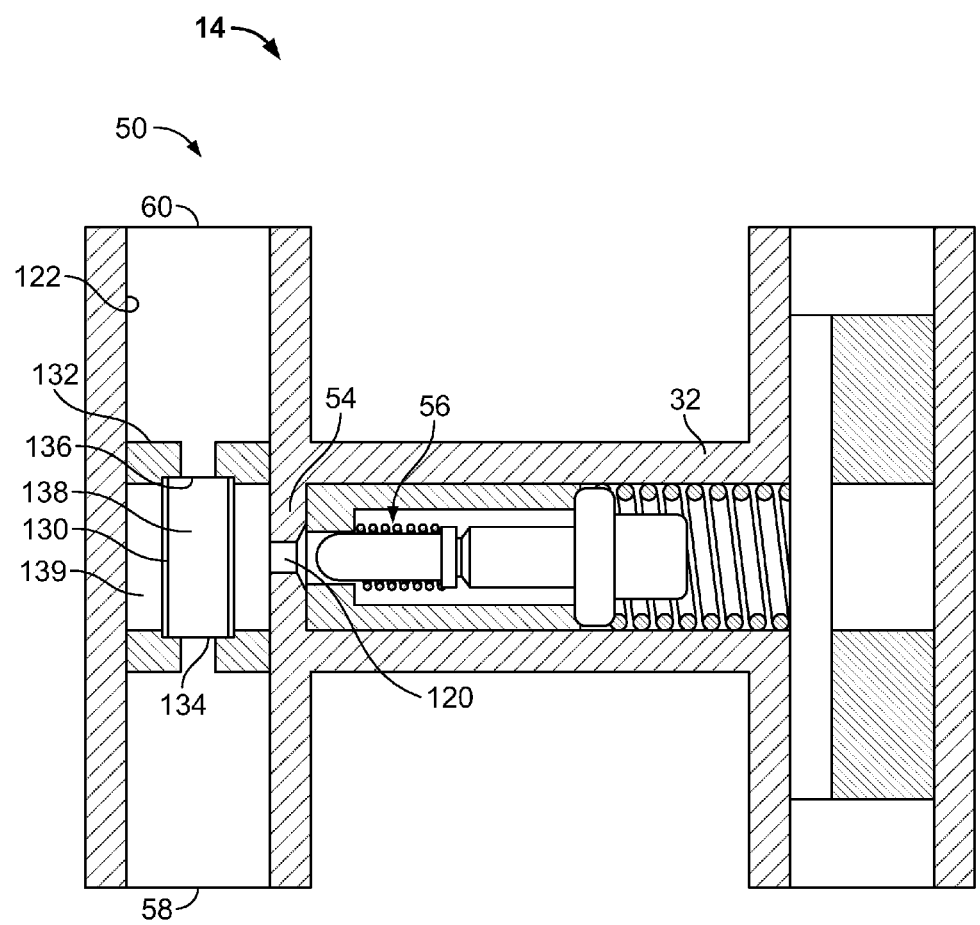

FIG. 4 is a side elevation view of the valve assembly 14, formed in accordance with an alternative embodiment, with a portion of the valve body 32 cutaway to illustrate the various components of the valve assembly 14. The valve assembly 14 includes a valve body 32 having a similar configuration as the valve body illustrated in FIG. 3. However, the valve assembly 14 illustrated in FIG. 4 includes a screen element 130 at the first end 50. The screen element 130 is retained in place by tabs 132 extending from the inner wall 122 of the valve body 32.

The screen element 130 is cylindrical in shape and is concentrically, axially aligned within the channel extending between the inlet and discharge ports 58, 60. The screen element 130 is open at inlet and discharge ends 134, 136, respectively, thereof. Water passes axially through an inner chamber 138 of the screen element 130 between the inlet and discharge ends 134, 136 as the water flows from the inlet port 58 to the discharge port 60. Water may also flow radially through the screen element 130 to an outer chamber 139, which is radially outward with respect to the inner chamber 138. The water flows from the outer chamber 139 to the passage 56. As the water flows radially through the screen element 130, the water is filtered and debris is removed from the water. As such, the water flowing into the opening 120 of the passage 56 has been filtered by the screen element 130. Any debris accumulated on the screen element 130 may be washed away by the flow of water through the screen element 130. For example, as water flows from the inlet port 58 to the discharge port 60, the water flows along the screen element 130 and removes the debris therefrom. In an alternative embodiment, the screen element 130 may be conically shaped or frusto-conically shaped to allow both axial and radial flow through the screen element 130 as water passes between the inlet and discharge ends 134, 136.

In an alternative embodiment, a cyclonic separator may be used rather than the screen element 130 to separate out the debris. A separator chamber may be positioned in the hot water path, such as in the position of the screen element 130 or otherwise upstream of the bypass path, or the separator chamber may be positioned in the bypass path upstream of the separating wall 54 and opening 120. As water flows through the separator, the water is directed in a swirling, circular manner before being discharged. As the water is swirled, the debris is collected by the separator.

Figure 5:
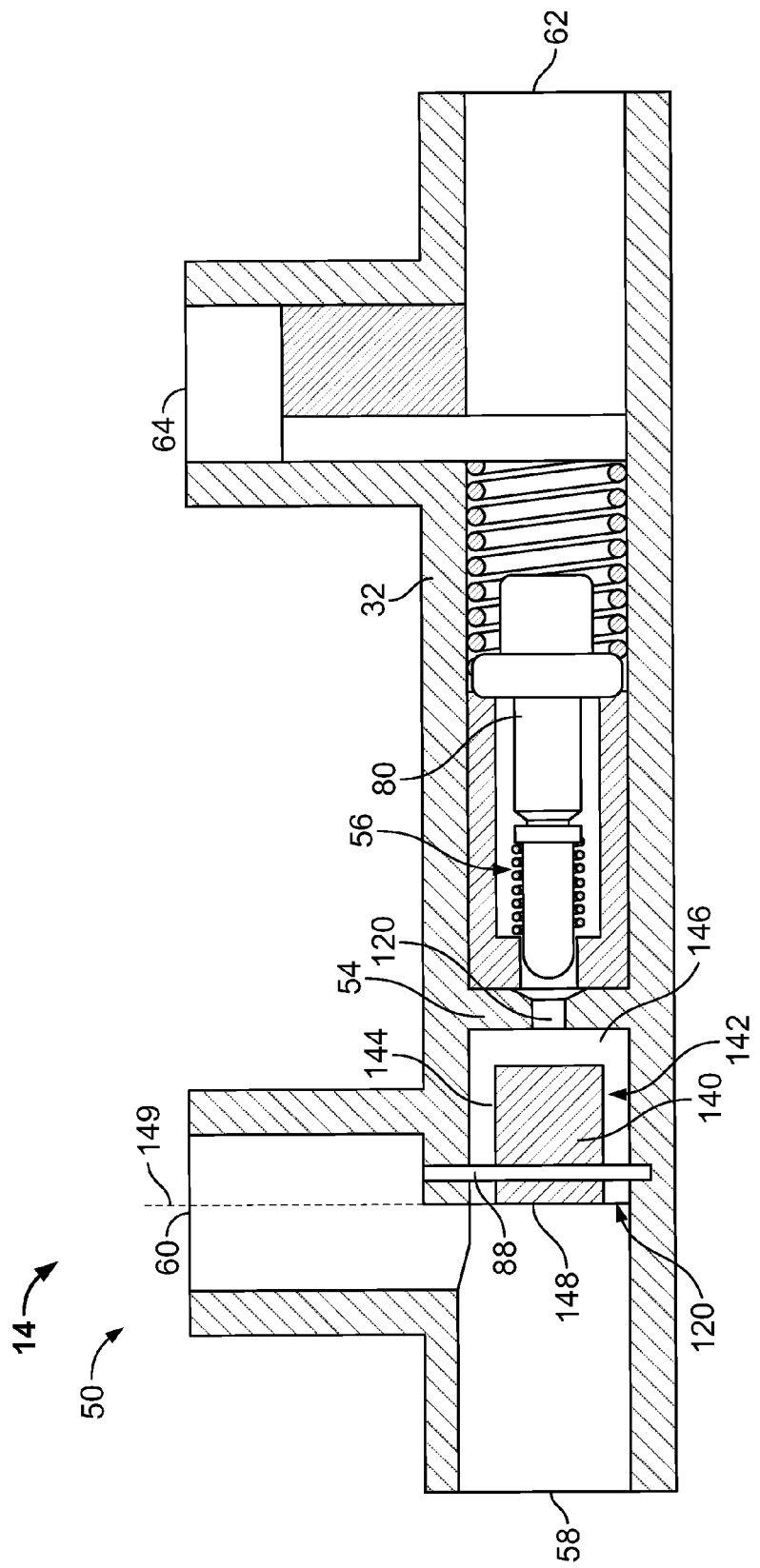

FIG. 5 is a side elevation view of the valve assembly 14, formed in accordance with another alternative embodiment, with a portion of the valve body 32 cutaway to illustrate the various components of the valve assembly 14. The valve assembly 14 includes a valve body 32 having a similar configuration as the valve body illustrated in FIG. 2, wherein the first and second inlet ports 58, 62 are axial ports and the first and second discharge ports 60, 64 are radial ports. A difference between the embodiment of FIG. 5 and the embodiment of FIG. 2 is that the embodiment of FIG. 5 does not include a screen 85 or a check valve 89 on the hot side 50 of the valve body 32.

The valve assembly 14 limits debris build-up around the actuating element 80 by limiting the ability for debris to enter the passage 56. In the illustrated embodiment, a plug 140 is positioned within a forward portion of the opening 120, also referred to hereinafter as a recess 142. The plug 140 is retained within the recess 142 by the retaining pin 88. The plug 140 has a smaller diameter than the recess 142 such that a circumferential passage 144 surrounds the plug 140. At the rearward end of the plug 140, the passage 144 opens to a radial channel 146 that is directed radially inward toward the central axis of the plug 140. The central axis of the plug is aligned with the portion of the opening 120 extending through the separating wall 54. The water flows through the passage 144, into the radial channel 146, and is directed therefrom through the opening 120. The plug 140 is sized and positioned to discourage plugging by debris. For example, the size of the passage 144 may be small enough to limit ingress of debris into the passage 144. The front end 148 is substantially aligned with the discharge port 60 such that any debris blocking the passage 144 may be removed or flushed as water flows from the inlet port 58 to the discharge port 60. The front end 148 of the plug 140 may extend parallel to a discharge axis 149 of the discharge port 60. Optionally, the front end 148 may be coincident with the discharge axis.

Figure 6:
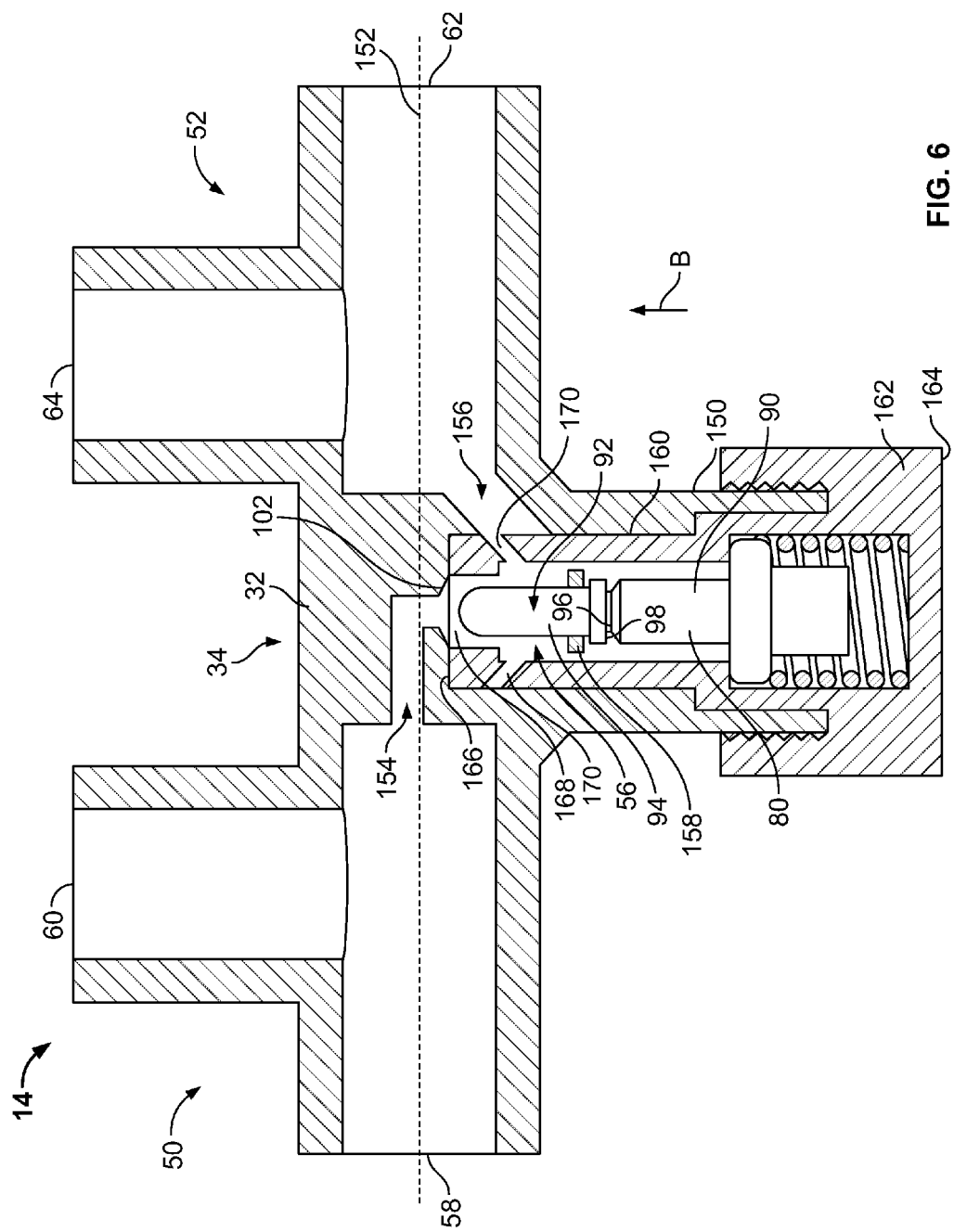
Figure 7:
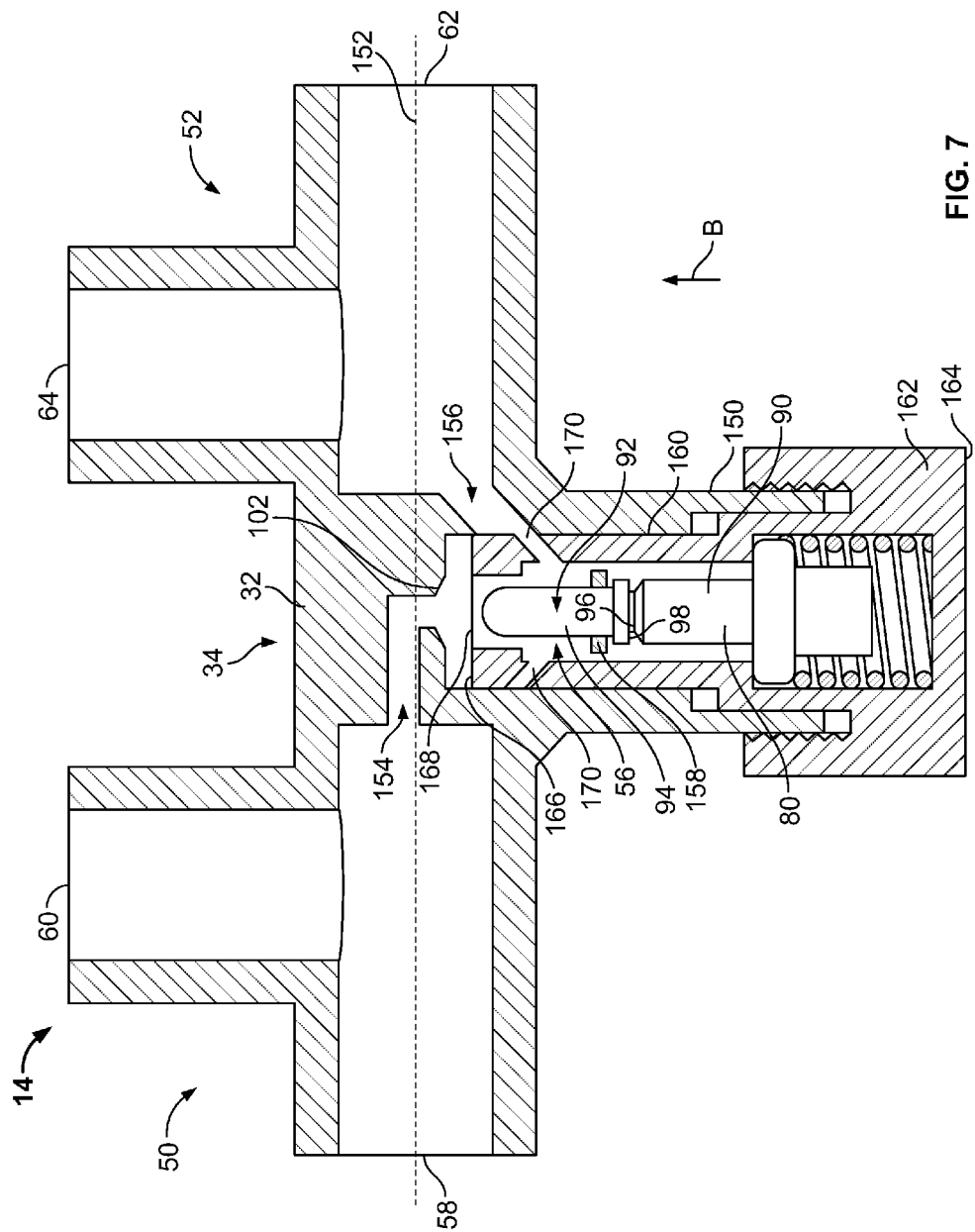

FIGS. 6 and 7 are side elevation views of the valve assembly 14, formed in accordance with a further alternative embodiment, with a portion of the valve body 32 cutaway to illustrate the various components of the valve assembly 14. FIG. 6 illustrates the valve assembly 14 in a first operable state. FIG. 7 illustrates the valve assembly in a second operable state. For example, in an exemplary embodiment, the first operable state is a fully loaded or fully assembled state, while the second operable state is a fully extended state. Other operable states may be provided between the fully loaded and the fully extended states. Optionally, as will be explained in further detail below, the valve assembly 14 is operable in multiple operable states to control a temperature set-point, or the temperature at which the bypass passage 56 is closed by the actuating element 80. Alternatively, or additionally, the valve assembly 14 is operable in multiple operable states to compensate for reduced toggle action. For example, when the actuating element 80 no longer closes the passage 56 because the poppet 94 does not seat against the valve seat 102, the position of the actuating element 80 may be adjusted relatively closer to the valve seat 102 so that the poppet 94 may close the bypass passage 56.

The valve assembly 14 includes a valve body 32 having a different configuration as the valve body illustrated in FIG. 2. While the first and second inlet ports 58, 62 are axial ports and the first and second discharge ports 60, 64 are radial ports, the passage 56 is non-axially aligned with the inlet ports 58, 62. The valve body 32 has a generally T-shape, wherein a stem portion 150 of the T-shaped body 32 includes the actuating element 80. The stem portion 150 extends orthogonally with respect to a longitudinal axis 152 extending between the inlet ports 58, 62. A hot interconnect channel 154 interconnects the hot side 50 and the passage 56 and a cold interconnect channel 156 interconnects the passage 56 and the cold side 52. The channels 154, 156 extend through the valve body 32. A flow path is thus created between the hot and cold sides 50, 52 by the channels 154, 156 and the passage 56.

In an exemplary embodiment, the valve body 32 is positioned within the water circulation system 10 (shown in FIG. 1) such that the passage 56 has a generally vertical orientation. The actuating element 80 is thus similarly orientated with a vertical orientation. The actuating element 80 is movable between the open and closed positions based on a temperature of the water. For example, the actuator body 90 includes a wax or a mixture of wax and metal powder (i.e., copper powder) enclosed in the actuator body 90 by means of a membrane made of elastomer or the like. Upon heating, the wax or wax with copper powder mixture slowly expands, thereby pushing the piston 96 and poppet 94 in an outward direction toward the valve seat 102, e.g. in a vertical direction shown generally by the arrow B. Upon cooling, the wax or wax/copper powder mixture contracts and the rod member 92 is forced inward by a gravitational force generally opposite the valve seat 102, e.g. in a direction opposite arrow B. By orienting the actuating element 80 in a vertical orientation, gravity may be used to unseat the poppet 94 from the valve seat 102 and generally cause the rod member 92 to contract to the open position. As such, a bias spring 82 (shown in FIG. 2) is not provided to force the rod member 92 to the open position. Optionally, a weight 158 may be added to force the rod member 92 to the open position. The weight 158 may have a generally toroidal shape having an open center. The weight 158 circumferentially surrounds the poppet 94 and seats on the flange 98 of the rod member 92. The weight 158 may have alternative shapes and may have alternative attachment configurations to the rod member 92.

The valve assembly 14 includes a sleeve 160 received within the stem portion 150 of the valve body 32. In an exemplary embodiment, the sleeve 160 is operably movable with respect to the valve body 32 between a fully loaded position (shown in FIG. 6) and a fully extended position (shown in FIG. 7). The sleeve 160 may have more than two operable positions, depending on the particular application. The sleeve 160 may also be completely removed from the valve body 32. The sleeve 160 may be fabricated from a material such as a molded plastic material, a reinforced plastic material, a metal material or other suitable material for plumbing. The sleeve 160 includes a cap portion 162 at an outer end 164 thereof. In an exemplary embodiment, the sleeve 160 is rotatably coupled to the valve body 32 such that the position of an inner end 166 of the sleeve 160 may be changed with respect to the valve seat 102. As will be explained in further detail below, by changing the relative position of the sleeve 160, and thus the actuating element 80 housed within the sleeve 160, the temperature set-point of the valve assembly 14 may be altered. The cap portion 162 is coupled to the valve body 32, such as by a threaded coupling, however other coupling methods may be used in alternative embodiments. Optionally, the cap portion 162 may have internal threads, and the valve body 32 may have corresponding external threads. Alternatively, the cap portion 162 may have external threads, and the valve body 32 may have corresponding internal threads. In an alternative embodiment, rather than coupling the sleeve to the stem portion 150, the stem portion 150 itself may be separately provided from the remainder of the valve body 32 (e.g. the top portion) and threadably coupled thereto. As the stem portion 150 is screwed into and out of the top portion, the relative position of the actuating element 80 with respect to the top portion, in particular, the valve seat 102, may be adjusted. Such embodiments may or may not include the sleeve 160. The sleeve 160 may be securely coupled to one of the movable components of the valve body 32. Alternatively, the sleeve 160 may be integrally formed with the stem portion 150. The sleeve 160 may entirely circumferentially surround the actuating element 80, or the sleeve 160 may surround only select portions of the actuating element 80. For example, the sleeve 160 may include a plurality of fins extending axially from a base, wherein the base is positioned at the upstream end of the sleeve 160, and a distal end of the fins may engage the section 104. The sleeve 160 may be concentrically aligned with the rod member 92 and/or the actuator body 90.

The sleeve 160 includes an inlet opening 168 at the inner end 166. The inlet opening 168 corresponds with, and opens to, the hot interconnect channel 154. When the actuating element 80 is in the open position, water flows into the sleeve 160 through the inlet opening 168 and thermally interacts with the actuating element 80. As described above, as the actuator body 90 of the actuating element 80 is heated up by the hot water flowing through the bypass portion 34, the actuating element 80 is actuated to the closed position, which stops water flow through the bypass portion 34 of the valve assembly 14.

The water is discharged from the sleeve 160 through a discharge opening 170. In the illustrated embodiment, the discharge opening 170 extends non-orthogonally with respect to the inlet opening 168. The discharge opening 170 corresponds with, and opens to, the cold interconnect channel 156. Optionally, the diameter of the discharge opening 170 may be different than the diameter of the cold interconnect channel 156. As such, and as will be explained in further detail below, the cold interconnect channel 156 may open to, and accept discharged water from, the discharge opening 170 when the discharge opening 170 is positioned in multiple positions. Optionally, the sleeve 160 may include a plurality of discharge openings 170 circumferentially spaced about the sleeve 160, wherein a single one of the discharge openings 170 communicates with the cold interconnect channel 156 depending on the position of the sleeve 160 within the valve body 32. For example, the sleeve 160 may include two discharge openings 170 spaced apart from each other by approximately 180 degrees. As the position of the sleeve 160 is changed with respect to the valve body 32 (e.g. as the sleeve 160 is moved to the fully extended position, which is shown in FIG. 7) the sleeve 160 is rotated approximately 180 degrees such that different ones of the discharge openings 170 are aligned with the cold interconnect channel 156 in the different positions. Optionally, each discharge opening 170 may have more than one operable position (e.g. the sleeve 160 may be rotated at least 360 degrees between the fully loaded and fully extended positions). Optionally, more than two discharge openings 170 may be provided, such that the amount of turning between operable positions is lessened. The number of holes may depend on the particular application and may be selected to maintain the structural integrity of the sleeve 160. Optionally, the discharge openings 170 may also be axially spaced such that the discharge openings 170 are arranged in a helical configuration. The discharge openings 170 may thus be aligned with the cold interconnect channel 156 as the sleeve 160 is backed out of, or loaded into, the valve body 32.

Optionally, at least a portion of the sleeve 160 may be coupled to the valve body 32, or may be integrally formed with the valve body 32.

Figure 8:
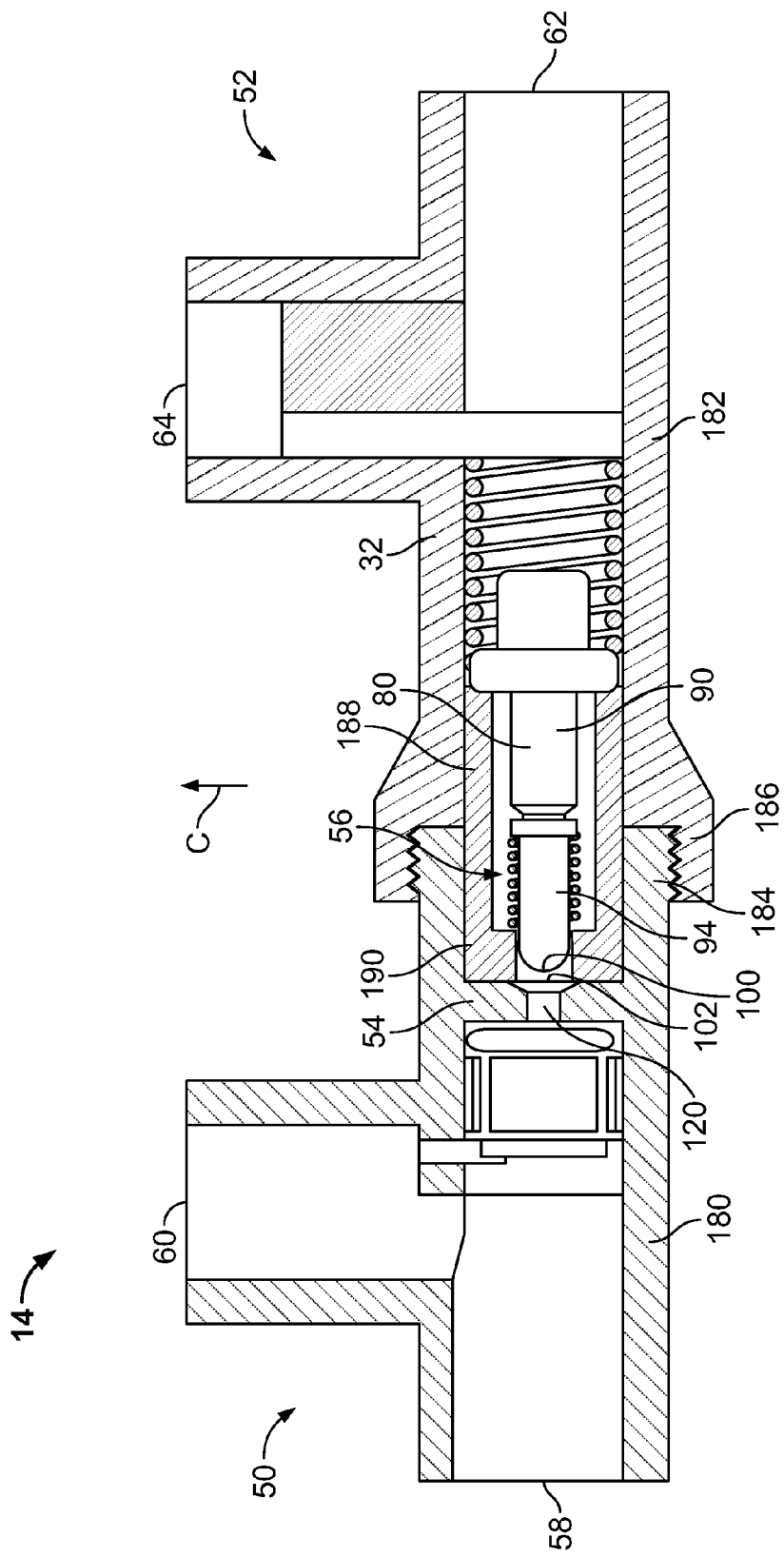

FIG. 8 is a side elevation view of the valve assembly 14, formed in accordance with another alternative embodiment, with a portion of the valve body 32 cutaway to illustrate the various components of the valve assembly 14. The valve assembly 14 includes a valve body 32 having a similar configuration as the valve body illustrated in FIG. 2, wherein the first and second inlet ports 58, 62 are axial ports and the first and second discharge ports 60, 64 are radial ports. The valve body 32 includes a hot portion 180 and a cold portion 182 that are joined to one another. Optionally, a seal, such as an O-ring, may be provided between the hot and cold portions 180, 182 to stop leakage. The hot portion 180 includes the hot side 50, including the first inlet and discharge ports 58, 60. The cold portion 182 includes the cold side 52, including the second inlet and discharge ports 62, 64. The hot portion 180 includes a mating end 184 having external threads thereon. The cold portion 182 includes a mating end 186 having internal threads therein. The portions 180, 182 are threadably coupled to one another using the threads at the respective mating ends 184, 186. In alternative embodiments, other coupling methods or devices may be used, such as clips, welds, glues, pins and the like. Utilizing a valve assembly 14 having hot and cold portions 180, 182 permits the portions 180, 182 to be oriented at different positions about the longitudinal axis of the valve assembly 14, which may allow the user to adjust the temperature set-point of the valve assembly 14, as will be explained below.

In an exemplary embodiment, the valve assembly 14 includes a sleeve 188, similar to the sleeve 170 illustrated in FIGS. 6 and 7. The sleeve 188 houses the actuating element 80 and is aligned with the opening 120 to the passage 56, which extends through the sleeve 188. In an exemplary embodiment, the sleeve 188 is coupled to the cold portion 182 and is loaded into the hot portion 180 as the hot and cold portions 180, 182 are coupled to one another. FIG. 8 illustrates the sleeve 188 in a fully loaded position, wherein an end 190 of the sleeve 188 abuts against the separating wall 54.

In an exemplary embodiment, the position of the sleeve 188 with respect to the separating wall 54 may be varied during assembly to control the distance between the actuating element 80 and the valve seat 102 at the separating wall 54. As described above, the distance between the end 100 of the poppet 94 and the valve seat 102 directly relates to the amount of extension of the actuator body 90 needed to seat the poppet 94 against the valve seat 102. The amount of extension of the actuator body 90 is proportional to the temperature of the water flowing past the actuator body 90. The greater the distance between the end 100 of the poppet 94 and the valve seat 102, the hotter the water must get in order to close the passage 56 and stop water flow from the hot side 50 through the bypass portion 34. The valve assembly 14 includes threads on the hot and cold portions 180, 182 of a certain length to accommodate multiple operating positions (e.g. each operating position orients the hot and cold portions 180, 182 with respect to one another such that the discharge ports 58, 62 are aligned with one another and/or face in a substantially similar direction, such as in the direction of arrow C). As the cold portion 182 is rotated with respect to the hot portion 180, the sleeve 188 may be advanced toward the fully assembled position. In such a manner, the temperature set-point of the actuating element 80 may be adjusted by controlling the relative positions of the hot and cold portions 180, 182 with respect to one another.

Figure 9:
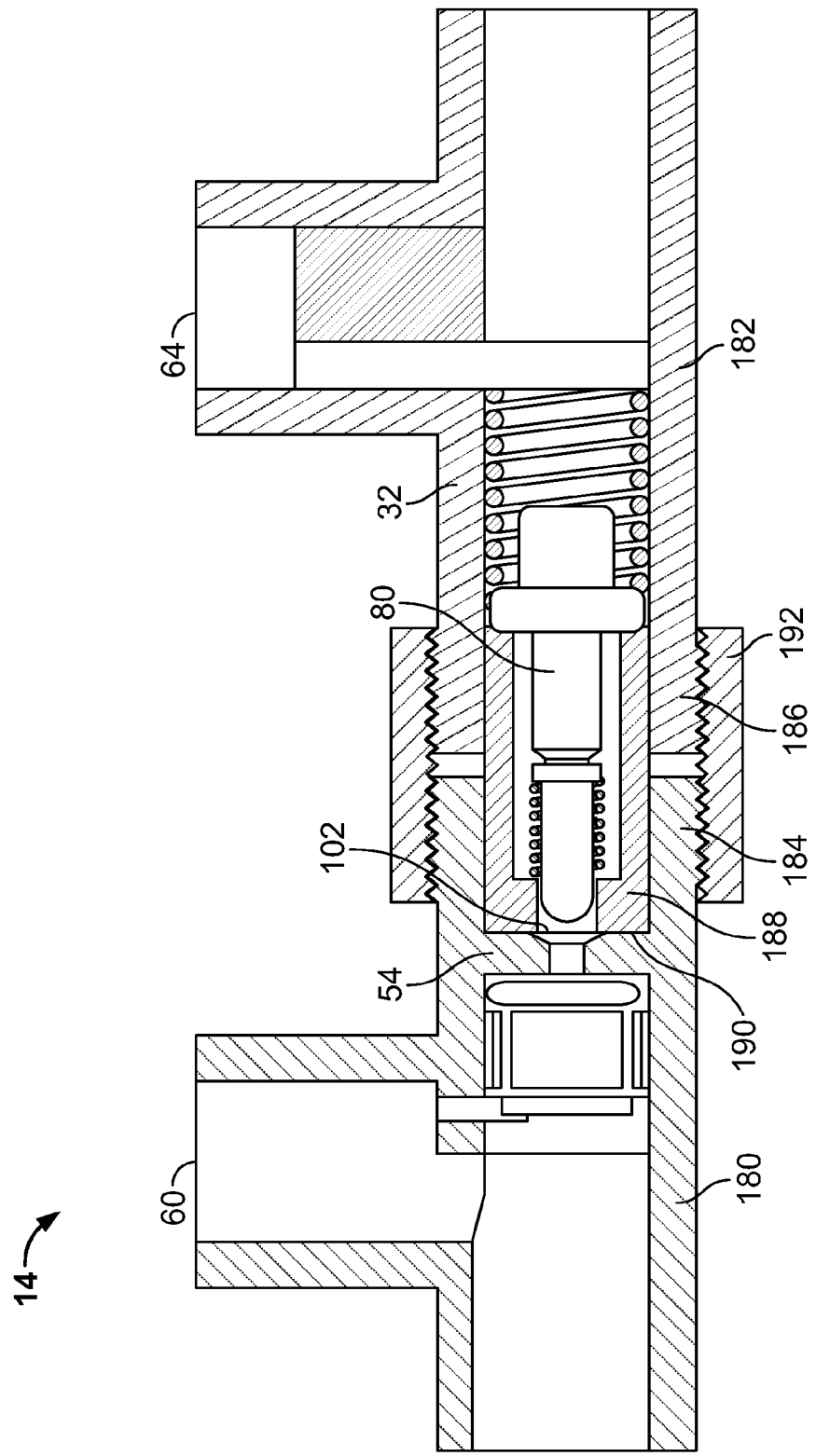

FIG. 9 is a side elevation view of the valve assembly 14, formed in accordance with yet another alternative embodiment, with a portion of the valve body 32 cutaway to illustrate the various components of the valve assembly 14. The valve assembly 14 includes a valve body 32 having a similar configuration as the valve body illustrated in FIG. 8, having the hot and cold portions 180, 182 that are joined to one another. The mating ends 184, 186 of the hot and cold portions 180, 182 both include external threads thereon. A separate threaded coupler 192 having internal threads is used to join the hot and cold portions 180, 182. In an exemplary embodiment, the sleeve 188 is coupled to the cold portion 182 and is advanceable into the mating end 184 of the hot portion 180 to a fully loaded position, which is illustrated in FIG. 9, wherein the end 190 of the sleeve 188 engages or abuts the separating wall 54. Optionally, the threads may be oriented such that rotation of the coupler 192 advances both mating ends 184, 186 generally toward one another. As such, the relative orientations of the hot and cold portions 180, 182 (e.g. the orientation of the discharge ports 60, 64) may be maintained as the hot and cold portions 180, 182 are advanced toward one another. As such, an almost infinite number of positions of the actuating element 80 with respect to the valve seat 102 may be obtained, as compared to the valve assembly embodiment of FIG. 8, wherein the number of positions that may be obtained is limited to allowable operable positions.

Figure 10:
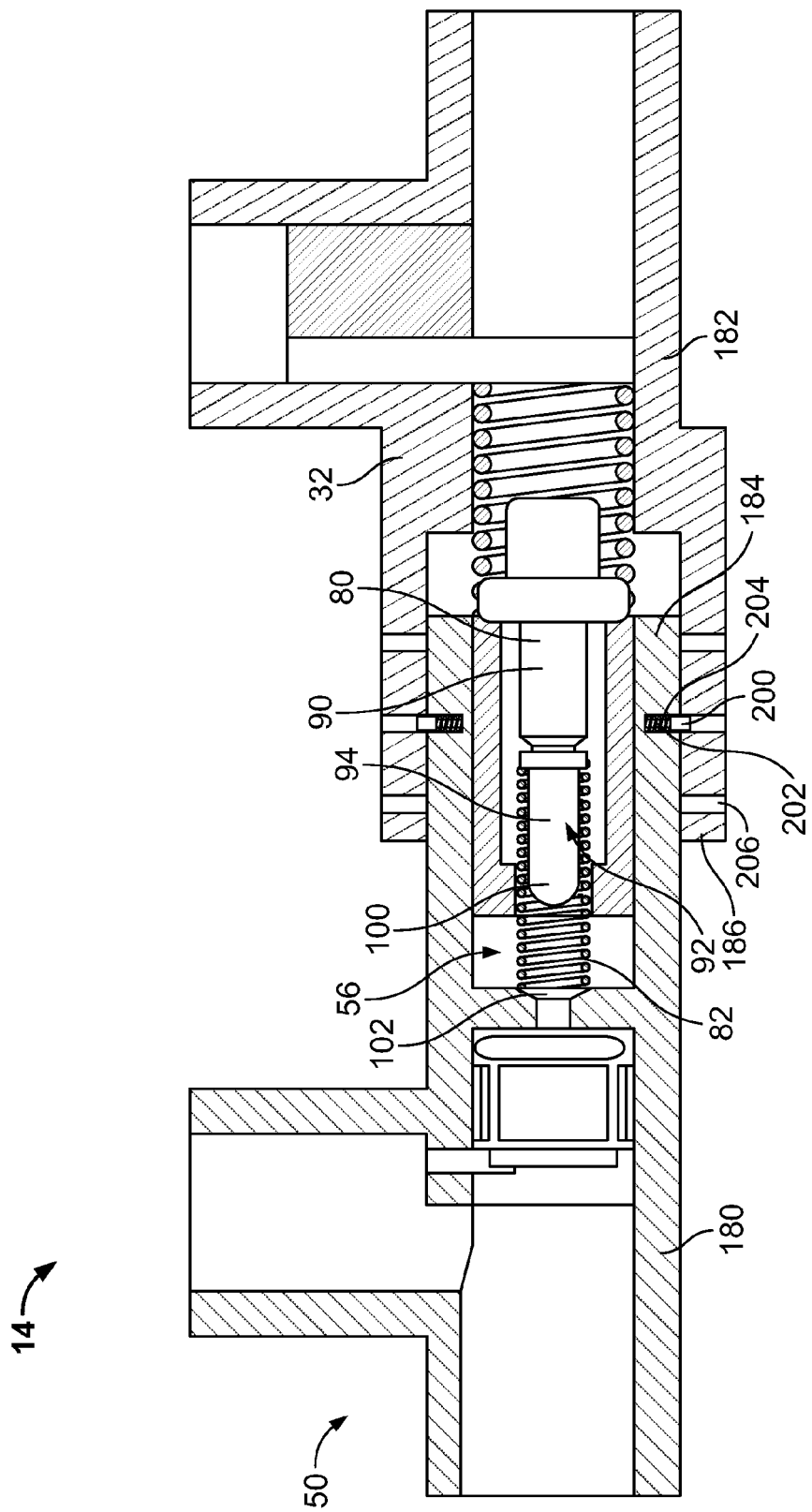

FIG. 10 is a side elevation view of the valve assembly 14, formed in accordance with a further alternative embodiment, with a portion of the valve body 32 cutaway to illustrate the various components of the valve assembly 14. The valve assembly 14 includes a valve body 32 having a similar configuration as the valve body illustrated in FIG. 8, having the hot and cold portions 180, 182 that are joined to one another. The mating end 186 of the cold portion 182 has an increased diameter as compared to the mating end 184 of the hot portion 180. The mating end 186 of the cold portion 182 receives the mating end 184 of the hot portion 180 therein. The hot and cold portions 180, 182 are movable with respect to one another, such as to increase or decrease the length of passage 56 or to change the position of the actuator body 90 along the length. The movement provides more or less distance between the end 100 of the poppet 94 and the valve seat 102. For example, when the hot and cold portions 180, 182 are moved relatively closer, the length of the passage 56 is decreased and less distance is provided between the end 100 of the poppet 94 and the valve seat 102. As such, the temperature of the water may be controlled.

The hot and cold portions 180, 182 are coupled to one another using pins 200. The pins 200 are received within pockets 202 within the valve body of the hot portion 180. Springs 204 are loaded within the pockets 202 to force the pins 200 radially outward. The cold portion 182 includes a plurality of slots 206 being axially spaced apart from one another by predetermined distances. In the illustrated embodiment, three sets of slots 206 are provided corresponding to three mating positions between the hot and cold portions 180, 182. A tool (not shown) may be used to force the pins 200 into a retracted position, wherein the hot and cold portions 180, 182 are slidable with respect to one another. The hot and cold portions 180, 182 are slid to the desired mating position, and the pins 200 release into the corresponding slots 206, thereby holding the relative positions of the hot and cold portions 180, 182.

As with other embodiments described above, the bias spring 82 forces the rod member 92 to an open position. When the temperature of the water flowing through the passage 56 reaches a predetermined amount, the actuator body 90 will expand and the poppet 94 will engage the valve seat 102, thus closing the passage 56 to flow from the hot side 50. The amount of travel of the poppet 94 to reach the valve seat 102 is proportional to the temperature of the water. Thus, by providing multiple mating positions between the hot and cold portions 180, 182, the temperature of the water flowing through the bypass portion 34 of the valve assembly 14 may be controlled. For example, depending on the particular actuating element 80 used, a temperature set-point of, for example, 97 degrees Fahrenheit may be achieved at the fully advanced, or inner-most, position of the hot and cold portions 180, 182, wherein the actuating element 80 may be closed when the water flowing through the passage 56 has a temperature of 97 degrees. When the hot and cold portions 180, 182 are moved to the intermediate mating position, which is the position illustrated in FIG. 10, the actuating element 80 is further away from the valve seat 102, and water having a higher temperature is needed to extend the actuating element the extra distance. For example, water have a temperature of approximately 99 degrees may be needed to close the bypass portion 34. As such, by changing the mating position, a water temperature increase of two degrees may be achieved before the bypass portion 34 is shut-off. In this manner the temperature of the water may be controlled. It is understood that the water temperature obtained is dependant on the actuating element, such as the type of material used, the thickness of the membrane, the amount of insulation, and the like. The temperature increase obtained by moving between the mating positions may also be controlled, such as by controlling the spacing between the slots 206, and may be more or less than two degrees, and the increments may be more or less than two degrees per mating position.

FIG. 11 illustrates another alternative embodiment, with a portion of the valve body 32 cutaway to illustrate the various components of the valve assembly 14. The valve assembly 14 includes a valve body 32 having a similar configuration as the valve body illustrated in FIG. 3, wherein both the hot and cold sides have radial-in/radial-out ports. The valve body 32 also includes an access port 220 being axially aligned with the bypass passage 56. The access port 220 is sized to allow the actuating element 80 to be loaded and removed therethrough. In an exemplary embodiment, the access port 220 is sized substantially similar to the bypass passage 56. A plug 222 is used to close the access port 220. The plug 222 may be threadably coupled within the access port 220 and may be variably positionable within the access port 220. Other coupling methods and/or elements may be used to couple the plug 222 to the valve body 32 to close off the access port 220, but that still allow the plug 222 to be variably positionable with respect to, and/or removable from, the access port 220.

The actuating element 80 may be fixed relative to an inner end 224 of the plug 222 such that the position of the actuating element 80 may be adjusted by adjusting the position of the plug 222 within the access port 220. In an exemplary embodiment, the actuating element may be securely fixed to the inner end 224. In an alternative embodiment, an over-travel spring may be positioned between the actuating element 80 and the inner end 224 of the plug 222 to maintain the positional relationship between the actuating element 80 and the plug 222. As the position of the plug 222 is changed with respect to the access port 220, so too is the position of the actuating element 80 with respect to the valve seat 102. Optionally, the amount of change is a one-to-one correlation, however this is not necessary in alternative embodiments.

Figure 12:
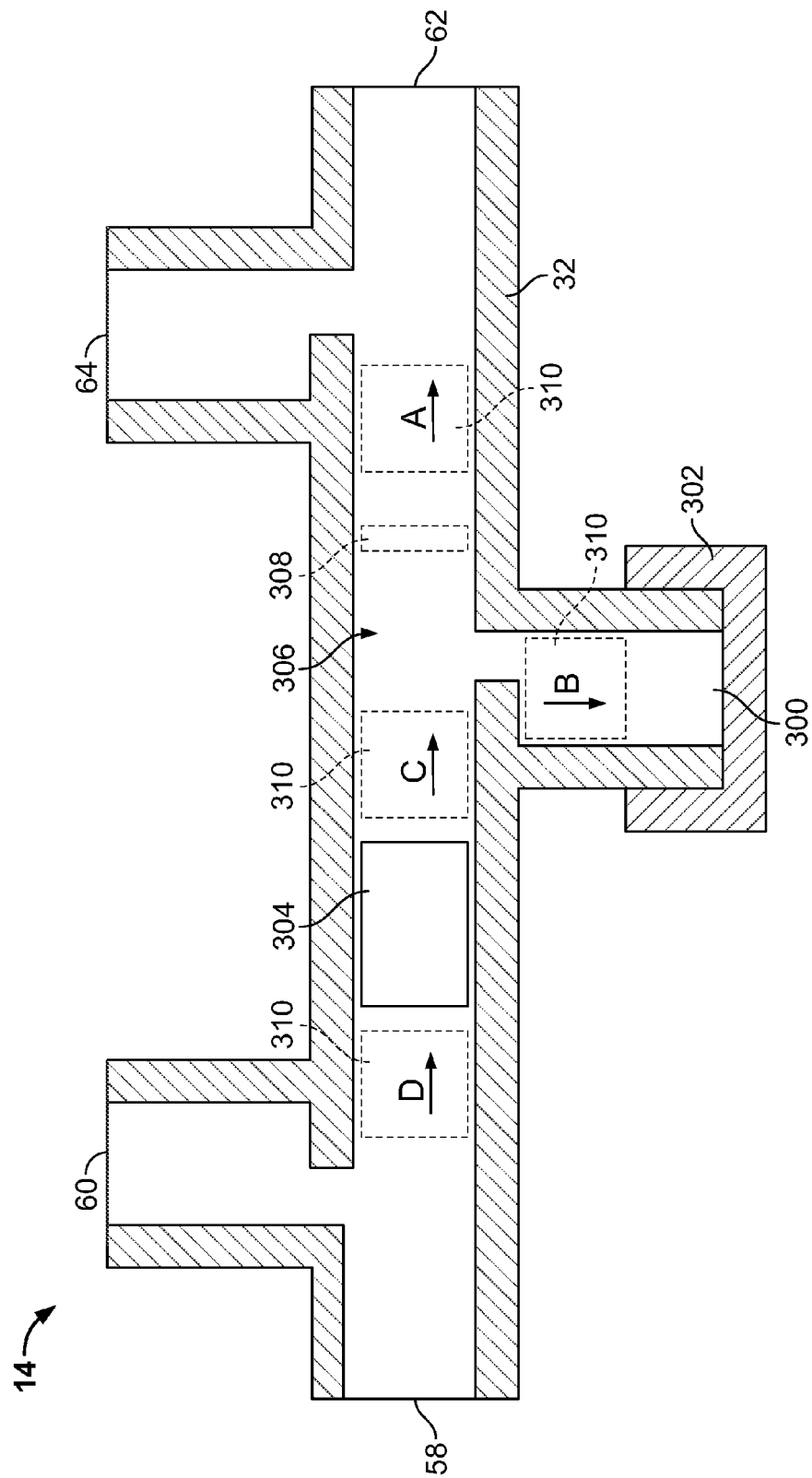

FIG. 12 illustrates another alternative embodiment, with a portion of the valve body 32 cutaway to illustrate the various components of the valve assembly 14. The valve assembly 14 includes a valve body 32 having a similar configuration as the valve body illustrated in FIG. 2, wherein the first and second inlet ports 58, 62 are axial ports and the first and second discharge ports 60, 64 are radial ports. A difference between the embodiment of FIG. 5 and the embodiment of FIG. 2 is that the embodiment of FIG. 5 includes a dedicated hot water return port 300.

In an exemplary embodiment, the dedicated hot water return port 300 is provided as on optional feature. The return port 300 is in fluid communication with the hot water inlet port 58, and hot water recirculation is permitted through the return port 300. In an exemplary embodiment, the valve assembly 14 may be utilized in different types of plumbing systems within the particular home/building. If the home/building were equipped with a hot water dedicated return line that provided a separate line to allow hot water recirculation from the fixture to the hot water heater, then the valve assembly 14 would plumb the dedicated hot water return port 300 to the provided dedicated return line. However, if the home/building were not equipped with a dedicated return line, then the valve assembly 14 would be plumbed to the hot and cold supply lines, in a similar manner as the valve assembly 14 illustrated in FIG. 2. In such an embodiment, flow through the return port 300 may be restricted by a flow restriction device, such as by a cap 302 that covers an end of the return port 300, or a by a plug element (not shown) that fits within the return port 300. The cap 302 is removable with respect to the valve body 32, to allow for one of the alternative plumbing methods. Optionally, the cap 302 may be threadably coupled to the valve body 32. Alternatively, the cap may be secured to the valve body 32 by an alternative fastening means, such as soldering.

In an alternative embodiment, rather than a plug or a cap, the flow restriction device may include a valve, such as a three-way valve may be coupled to, or received within, the valve body 32 to selectively control the flow of water therethrough. For example, in a first position, the three-way valve may allow flow from the hot side to the cold water inlet port 62 and restrict flow to the dedicated hot water return port 300. In a second position, the three-way valve may restrict flow from the hot side to the cold water inlet port 62 and allow flow to the dedicated hot water return port 300. As such, when the valve assembly 14 is installed, the three-way valve may be selectively positioned based on the type of recirculation system being used within the particular home/building (e.g. dedicated return or cold water line return). Alternatively, another type of valve, such as a gate valve or a ball valve may be provided within the valve body 32 to restrict flow only to the dedicated hot water return port 300. As such, if the valve assembly 14 is being used with a dedicated return line type of system, the valve may be opened, allowing flow to the return port 300, but if a cold return line system is used, the valve may remain closed.

Flow through the valve assembly 14 is controlled by a flow control unit 304, which is illustrated schematically in FIG. 12. The flow control unit 304 is positioned within a bypass passage 306 that is downstream of the hot water discharge port 60. Optionally, the flow control unit may be a thermally sensitive actuating element, such as the actuating element 80 illustrated in FIG. 2. Alternatively, the flow control unit may be a different type of device for controlling the flow of water through the bypass passage 306, such as a wax motor type of device, an electrically actuated valve, a hydraulically actuated valve, a pneumatically actuated valve, and the like. Optionally, the bypass passage 306 may have an opening sized approximately the same as the hot water inlet 58, which allows a high flow rate of water therethrough to quickly re-circulate water through the valve assembly 14. Alternatively, a wall may be provided with a small opening to the bypass passage 306 to allow a smaller flow of water through the bypass passage 306, which allows a low flow rate of water therethrough to more slowly re-circulate water through the valve assembly 14.

In an exemplary embodiment that utilizes the dedicated hot water return port to recirculate the water through the valve assembly 14, a wall 308 (shown in phantom in FIG. 12) may be provided to separate the hot and cold sides of the valve assembly 14. In particular, the wall 308 restricts water flow from the hot water inlet port 58 to the cold water inlet port 62, and vice versa. Recirculation through the valve assembly 14 is permitted only through the dedicated hot water return port 300. In such an embodiment, no cap 302 is used to restrict flow through the return port 300.

The valve assembly 14 may also utilize at least one flow restrictor, such as a check valve 310, to control the flow of water through the valve body 32 in addition to the flow control unit 304. While the following description of the flow restrictors are in terms of check valves 310, the flow restrictors are not intended to be limited to check valves. FIG. 12 illustrates four exemplary locations for the check valves 310, namely A, B, C and D. In an exemplary embodiment, two check valves 310 are provided, with one at location A and another at any of locations B, C or D. Arrows are provided to indicate the flow direction through the check valves 310. The check valve 310 at location A restricts water flow from the cold side of the valve assembly 14 into the hot side of the valve assembly 14. The check valve at any of locations B, C or D restricts water flow from the dedicated return port 300 into the hot side of the valve assembly 14.

The check valves 310 allow water to flow therethrough when the water pressure is above a predetermined threshold. For example, when the pump 16 is operated, and when the flow control unit 304 is open, the pressure of the water is great enough to overcome the force holding the check valve closed. For example, a spring is used to hold a ball against a seat within the check valve. When the pump 16 is operated, the pressure of the water flowing through the hot water inlet port is greater than the spring force holding the ball against the seat, and the check valve 310 is opened, which allows water to flow therethrough. In an exemplary embodiment, the check valve 310 at location A has a different, higher, spring pre-load the check valve 310 at location B, C or D such that the force needed to overcome the spring force holding the check valve 310 at location A closed is higher then the force needed to overcome the spring force holding the check valve at location B, C or D closed. As such, the spring of check valve 310 at location A is a heavy spring and the spring of check valve 310 at location B, C or D is a light spring. The different spring pre-loads are particularly useful when the recirculating flow is desired through the dedicated hot water return port 300 (e.g. the cap 302 is removed and a dedicated return is coupled to the return port 300) and when the check valve 310 is at location B, such that the water flowing through the bypass passage 306 is first directed through the check valve 310 at location B because the check valve 310 at location B has a lower spring pre-load. As long as the check valve at location B is open, the pressure of the water should not exceed the spring pre-load of the check valve 310 at location A. As such, all recirculating flow occurs through the dedicated hot water return port 300 and not through the cold water inlet port 62. Additionally, once the flow control unit 304 is closed (e.g. the temperature of the water is at an acceptable level), then water is restricted from flowing to either the dedicated hot water return port 300 or the cold water inlet port 62.

In an alternative embodiment, a flow restrictor, such as a check valve 310, may be positioned only at location B to restrict water from flowing from the dedicated hot water return port 300 into the bypass passage 306. The check valve 310 allows water flow from the bypass passage 306 when the pump 16 is operated and when the flow control unit 304 is open.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A valve assembly for a water circulation system, the valve assembly comprising:
    a valve body having a hot portion and a cold portion, the hot portion having a hot inlet port configured to be coupled to a hot water supply line, the cold portion having a cold inlet port configured to be coupled to a cold inlet supply line, the valve body having at least one discharge port, the hot portion having a hot mating end, the cold portion having a cold mating end, the hot mating end being coupled to the cold mating end, wherein a bypass passage is defined between the hot portion and the cold portion, the bypass passage having a valve seat therein;
    a bypass valve received within the bypass passage, the bypass valve restricting the flow of water through the bypass passage based on a temperature of the water in the bypass passage;
    wherein the hot portion is variably positionable with respect to the cold portion to control a position of the bypass valve with respect to the valve seat to control a bypass shut-off temperature of the water, and wherein the hot portion is variably positionable with respect to the cold portion such that a relative distance between the hot inlet port and the cold inlet port vary as the hot portion is moved relative to the cold portion.

2. The valve assembly of claim 1, wherein the bypass valve is moved relatively closer to the valve seat to decrease the bypass shut-off temperature of the water.

3. The valve assembly of claim 1, wherein the bypass valve includes a piston and a poppet attached to the piston, a distal end of the poppet being configured to engage the valve seat to close the bypass passage.

4. The valve assembly of claim 1, further comprising a sleeve coupled to the cold portion, the sleeve holding the bypass valve, the sleeve being received in the hot portion, the sleeve being variably positionable within the hot portion based on the position of the hot portion with respect to the cold portion.

5. The valve assembly of claim 1, wherein the cold portion is threadably coupled to the hot portion.

6. The valve assembly of claim 1, wherein the cold portion is threadably coupled to the hot portion using a threaded coupler.

7. The valve assembly of claim 1, wherein the hot and cold portions are coupled to one another in multiple positions using spring-loaded pins.

8. The valve assembly of claim 1, wherein the hot and cold portions are variably positionable with respect to one another such that a distance between the cold inlet and the hot inlet may be increased or decreased depending on the position of the cold portion with respect to the hot portion.

9. The valve assembly of claim 1, wherein the at least one discharge port comprises a hot discharge port at the hot portion of the valve body and a cold discharge port at the cold portion of the valve body, the hot and cold discharge ports being positioned on a common radial side of the valve body.

10. A valve assembly for a water circulation system, the valve assembly comprising:
    a valve body having a hot portion and a cold portion, the hot portion having a hot inlet port configured to be coupled to a hot water supply line, the cold portion having a cold inlet port configured to be coupled to a cold inlet supply line, the valve body having at least one discharge port, the hot portion having a hot mating end, the cold portion having a cold mating end, the hot mating end being coupled to the cold mating end, wherein a bypass passage is defined between the hot portion and the cold portion, the bypass passage having a valve seat therein;
    a bypass valve received within the bypass passage, the bypass valve restricting the flow of water through the bypass passage based on a temperature of the water in the bypass passage; and
    a sleeve received in the bypass passage, the bypass valve being received in the sleeve, the sleeve being variably positionable with respect to an inlet of the bypass passage to control the position of the bypass valve with respect to the valve seat, the sleeve having a sleeve inlet and a sleeve discharge, wherein water flows into the sleeve through the sleeve inlet from the inlet of the bypass passage and water flows out of the sleeve through the sleeve outlets
    wherein the hot portion is variably positionable with respect to the cold portion to control a position of the bypass valve with respect to the valve seat to control a bypass shut-off temperature of the water.

11. The valve assembly of claim 10, wherein the bypass valve is moved relatively closer to the valve seat to decrease the bypass shut-off temperature of the water.

12. The valve assembly of claim 10, wherein the bypass valve includes a piston and a poppet attached to the piston, a distal end of the poppet being configured to engage the valve seat to close the bypass passage.

13. The valve assembly of claim 10, wherein the valve body extends along a longitudinal axis, the cold portion being movable along the longitudinal axis with respect to the hot portion, the bypass valve having an actuating element movable between a retracted position and an extended position based on a temperature of the water in the bypass passage, the actuating element being movable in a direction along the longitudinal axis.

14. A valve assembly for a water circulation system, the valve assembly comprising:
a valve body having a hot portion and a cold portion, the valve body extends along a longitudinal axis, the cold portion being movable along the longitudinal axis with respect to the hot portion the hot portion having a hot inlet port configured to be coupled to a hot water supply line, the cold portion having a cold inlet port configured to be coupled to a cold inlet supply line, the valve body having at least one discharge port, the hot portion having a hot mating end, the cold portion having a cold mating end, the hot mating end being coupled to the cold mating end, wherein a bypass passage is defined between the hot portion and the cold portion, the bypass passage having a valve seat therein;
a bypass valve received within the bypass passage, the bypass valve having an actuating element movable between a retracted position and an extended position based on a temperature of the water in the bypass passage, the actuating element being movable in a direction along the longitudinal axis, the bypass valve restricting the flow of water through the bypass passage based on a temperature of the water in the bypass passage;
wherein the hot portion is variably positionable with respect to the cold portion to control a position of the bypass valve with respect to the valve seat to control a bypass shut-off temperature of the water.

15. The valve assembly of claim 14, wherein the bypass valve is moved relatively closer to the valve seat to decrease the bypass shut-off temperature of the water.

16. The valve assembly of claim 14, wherein the bypass valve includes a piston and a poppet attached to the piston, a distal end of the poppet being configured to engage the valve seat to close the bypass passage.

17. The valve assembly of claim 14, further comprising a sleeve received in the bypass passage, the bypass valve being received in the sleeve, the sleeve being variably positionable with respect to an inlet of the bypass passage to control the position of the bypass valve with respect to the valve seat, the sleeve having a sleeve inlet and a sleeve discharge, wherein water flows into the sleeve through the sleeve inlet from the inlet of the bypass passage and water flows out of the sleeve through the sleeve outlet.

18. The valve assembly of claim 14, wherein the cold portion is threadably coupled to the hot portion.

19. The valve assembly of claim 14, wherein the cold portion is threadably coupled to the hot portion using a threaded coupler.

20. The valve assembly of claim 14, wherein the hot and cold portions are coupled to one another in multiple positions using spring-loaded pins.

* * * * *